United States Patent
Carr et al.

(10) Patent No.: US 12,312,064 B2
(45) Date of Patent: May 27, 2025

(54) SHAPED AIRCRAFT FUEL CELLS, SYSTEMS AND METHODS FOR ENHANCED CRASHWORTHINESS

(71) Applicant: Bell Textron Inc., Fort Worth, TX (US)

(72) Inventors: Timothy Brian Carr, Fort Worth, TX (US); Joshua Robert O'Neil, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 694 days.

(21) Appl. No.: 17/484,852

(22) Filed: Sep. 24, 2021

(65) Prior Publication Data
US 2023/0095015 A1 Mar. 30, 2023

(51) Int. Cl.
*B64D 37/06* (2006.01)
*B64C 1/06* (2006.01)
(Continued)

(52) U.S. Cl.
CPC .............. *B64C 1/062* (2013.01); *B64D 37/02* (2013.01); *B64D 37/04* (2013.01); *B64D 37/06* (2013.01); *B64D 37/32* (2013.01)

(58) Field of Classification Search
CPC ... B64C 1/062; B64C 37/32; B64C 2041/005; B64C 2025/325; B64C 27/04;
(Continued)

(56) References Cited

U.S. PATENT DOCUMENTS

| | | | | |
|---|---|---|---|---|
| 2,262,606 A | * | 11/1941 | Hardman | B64D 37/04 244/123.12 |
| 2,623,721 A | * | 12/1952 | Harrington | B64D 37/06 244/135 R |

(Continued)

FOREIGN PATENT DOCUMENTS

| | | | | |
|---|---|---|---|---|
| CA | 2331107 A1 | * | 7/2001 | B64C 1/062 |
| CN | 111085660 A | * | 5/2020 | |

(Continued)

OTHER PUBLICATIONS

Hong Beom Park, Dewan Hasan Ahmed, Kyung Heon Lee, Hyung Jin Sung; An H-shaped design for membraneless micro fuel cells; 2009; Electrochimica Acta; vol. 54; Issue 18; pp. 4416-4425. (Year: 2009).*

*Primary Examiner* — Richard Green
*Assistant Examiner* — Michael A. Fabula
(74) *Attorney, Agent, or Firm* — Fogarty LLP

(57) ABSTRACT

An aircraft, such as a rotorcraft, may have at least one area designated to house at least one fuel cell and at least one aircraft structure that may translate, during a drop impact of the aircraft, into the area designated to house the fuel cell. At least one shaped fuel cell may be provided and deployed therein, in accordance with the present systems and methods. Each respective shaped fuel cell may define at least one respective through-voids defined through the respective shaped fuel cell, and/or at least one respective edge cavity defined along an edge of the shaped fuel cell, wherein the respective through-void and/or the respective edge cavity (Continued)

correspond to the respective aircraft structure that may translate, during the drop impact of the aircraft, into the area of the aircraft designated to house the respective fuel cell to receive and accommodate the respective structure during the drop impact.

13 Claims, 6 Drawing Sheets

(51) Int. Cl.
  *B64D 37/02* (2006.01)
  *B64D 37/04* (2006.01)
  *B64D 37/32* (2006.01)
(58) Field of Classification Search
  CPC .... H01M 8/002; H01M 8/2465; H01M 8/247;
  H01M 8/2475; H01M 8/249; H01M
  8/2495; H01M 2250/20; H01M 50/249;
  B64D 27/355; B64D 37/02; B64D 37/04;
  B64D 37/06; B64D 37/32; B64D 37/005
  See application file for complete search history.

(56) References Cited

U.S. PATENT DOCUMENTS

| | | | | |
|---|---|---|---|---|
| 2,943,815 A * | 7/1960 | Besson | F02K 7/10 244/135 R |
| 3,951,362 A * | 4/1976 | Robinson | B64D 37/06 220/560.07 |
| 3,979,005 A * | 9/1976 | Robinson | B64D 37/06 220/560.07 |
| 4,345,698 A * | 8/1982 | Villemain | B64D 37/02 220/900 |
| 4,368,086 A * | 1/1983 | Villemain | B64D 37/02 220/900 |
| 4,925,057 A * | 5/1990 | Childress | B60K 15/077 169/45 |
| 5,371,935 A * | 12/1994 | Furs | B64D 37/02 29/402.03 |
| 5,451,015 A * | 9/1995 | Cronkhite | B64D 37/02 244/119 |
| 6,554,152 B2 * | 4/2003 | Smith | F17C 13/123 220/560.01 |
| 10,196,151 B2 * | 2/2019 | Peryea | B64D 37/06 |
| 10,301,032 B2 * | 5/2019 | Carr | B05D 1/02 |
| 10,710,699 B2 * | 7/2020 | Plagianos | B64D 37/32 |
| 10,724,432 B2 * | 7/2020 | Shapiro | H01M 8/2428 |
| 11,332,258 B2 * | 5/2022 | Carr | B64D 37/005 |
| 11,623,758 B2 * | 4/2023 | Terry | B64D 37/06 244/135 R |
| 11,873,111 B2 * | 1/2024 | Carr | B60L 50/71 |
| 12,054,277 B2 * | 8/2024 | Mishra | B64D 37/04 |
| 2004/0028986 A1 * | 2/2004 | Tsunoda | H01M 8/2483 429/456 |
| 2004/0043270 A1 * | 3/2004 | Tsunoda | H01M 8/2457 429/454 |
| 2004/0234837 A1 * | 11/2004 | Dan | H01M 8/1231 429/514 |
| 2004/0247987 A1 * | 12/2004 | Izumi | H01M 8/025 429/514 |
| 2011/0305960 A1 * | 12/2011 | Song | H01M 8/2483 429/457 |
| 2013/0214095 A1 * | 8/2013 | Bofill | B64D 37/06 29/525.01 |
| 2015/0136906 A1 * | 5/2015 | Fink | B64C 1/18 244/119 |
| 2017/0313434 A1 * | 11/2017 | Peryea | B64D 37/32 |
| 2021/0269169 A1 * | 9/2021 | Terry | B64D 37/04 |
| 2022/0106055 A1 * | 4/2022 | Mishra | B64D 37/32 |
| 2022/0212550 A1 * | 7/2022 | Carr | B64D 37/02 |
| 2023/0109645 A1 * | 4/2023 | Stowell | H01M 4/0404 428/307.3 |
| 2023/0227168 A1 * | 7/2023 | Pettey | B64C 3/34 244/165 |
| 2023/0227172 A1 * | 7/2023 | Pettey | B32B 27/40 220/560.02 |
| 2023/0282866 A1 * | 9/2023 | Shim | H01M 8/2484 |

FOREIGN PATENT DOCUMENTS

| | | | | |
|---|---|---|---|---|
| DE | 350618 C * | 3/1922 | B64D 37/02 |
| DE | 102009055108 A1 * | 6/2011 | B64D 37/06 |
| EP | 2905228 A1 * | 8/2015 | B64C 1/061 |
| EP | 3296214 A1 * | 3/2018 | B64C 1/10 |
| EP | 3366592 A1 * | 8/2018 | B05D 1/02 |
| EP | 3584151 A1 * | 12/2019 | B64C 1/061 |
| FR | 926522 A * | 10/1947 | B64D 37/06 |
| GB | 558459 A * | 1/1944 | B64D 37/06 |
| GB | 640293 A * | 7/1950 | B64D 37/06 |
| WO | WO-2011068443 A1 * | 6/2011 | B64C 39/024 |
| WO | WO-2021242432 A2 * | 12/2021 | B32B 1/00 |

\* cited by examiner

SHAPED AIRCRAFT FUEL CELLS, SYSTEMS AND METHODS FOR ENHANCED CRASHWORTHINESS

TECHNICAL FIELD

The present disclosure relates generally to aircraft, more particularly to aircraft fuel systems, and specifically to shaped aircraft (e.g., rotorcraft) fuel cells, systems and methods for enhanced crashworthiness.

BACKGROUND

Aircraft certification regulations ensure protection of aircraft fuel tanks and require that damage to fuel tanks is minimized during a crash. Among other responsibilities, the United States Federal Aviation Administration (FAA) has established airworthiness standards for aircraft, such as airplanes and rotorcraft. The FAA also provides airworthiness approval for aircraft and aircraft components to certify that they conform to an approved design and are in a condition for safe operation. FAA regulations directed to airworthiness standards for transport rotorcraft require crash resistance for aircraft fuel systems. These standards are intended to minimize the hazard of fuel fires to occupants following an otherwise survivable impact, such as a hard landing. Additionally, FAA regulations require that fuel systems be capable of sustaining certain static and dynamic deceleration loads without structural damage to the fuel tanks or their components that could leak fuel to an ignition source.

One requirement for obtaining rotorcraft fuel system airworthiness approval is the successful completion of a drop test. The drop test requirements include: (1) a drop height of at least 50 feet; (2) a nondeforming drop impact surface; (3) fuel tanks filled with water to 80 percent of the normal full capacity or with fuel to the full capacity; (4) the fuel tank must be enclosed in a surrounding structure representative of the installation unless it can be established that the surrounding structure is free of projections or other design features likely to contribute to rupture of the tank; (5) the fuel tank must drop freely and impact in a horizontal position +/−10 degrees; and (6) after the drop test, there must be no leakage.

SUMMARY

Embodiments are directed to systems and methods for preventing rupture of fuel cells in an aircraft during a drop impact of the aircraft. Thereby, in an aircraft, such as a rotorcraft, having (an) area(s) designated to house (a) fuel cell(s) and (an) aircraft structure(s) that may translate, during a drop impact of the aircraft, into the area(s) designated to house the fuel cell(s), (a) shaped fuel cell(s) may be provided and deployed in accordance with the present systems and methods. Each respective shaped fuel cell may define (a) respective through-void(s), defined through the respective shaped fuel cell, and/or (an) respective edge cavit(y)(ies), defined along (an) edge(s) of the shaped fuel cell, wherein the respective through-void(s) and/or respective edge cavit(y)(ies) correspond to the respective aircraft structure(s) that may translate, during the drop impact of the aircraft, into the area(s) of the aircraft designated to house the respective fuel cell(s).

The drop impact of the aircraft may be a crash, a drop test, etc. The aircraft structure(s) that translate(s), during a drop impact of the aircraft, into the area(s) of the aircraft designated to house the fuel cell(s) may be pushed into the area(s) of the aircraft designated to house the fuel cell(s) as a result of impact of the aircraft with a surface. For example, the aircraft structure(s) that translate(s), during a drop impact of the aircraft, into the area(s) of the aircraft designated to house the fuel cell(s) may be pushed upward into the area(s) of the aircraft designated to house the fuel cell(s) by impact of the aircraft with the surface. Additionally, or alternatively, the aircraft structure(s) may translate(s), during a drop impact of the aircraft, into the area(s) of the aircraft designated to house the fuel cell(s) by being pushed downward, by inertia, into the area(s) of the aircraft designated to house the fuel cell(s), as a result of the impact of the aircraft with the surface.

Accordingly, a process for preventing rupture of fuel cells in an aircraft during a drop impact of the aircraft may call for reviewing the layout of the aircraft and determining aircraft structures that will translate, during a drop impact of the aircraft, into a fuel cell area of the aircraft and providing (a) shaped fuel cell(s) accordingly. Provision (manufacturing, forming, or the like) of the shaped fuel cell(s) may entail defining one or more through-voids in the shaped fuel cell(s), with each through-void corresponding to an aircraft structure determined to translate, during the drop impact of the aircraft, into the fuel cell area of the aircraft. Provisioning of the shaped fuel cell(s) may additionally, or alternatively include defining one or more edge cavities in the shaped fuel cell(s), each edge cavity also corresponding to an aircraft structure determined to translate, during the drop impact of the aircraft, into the fuel cell area of the aircraft. The(se) shaped fuel cell(s) is (are) installed in the fuel cell area(s) of the aircraft, with the through void(s) and/or the edge cavit(y)(ies) corresponding to the aircraft structure(s) determined to translate, during the drop impact of the aircraft, into the fuel cell area(s) of the aircraft.

Thereby, during a drop impact, such as a crash, hard landing, or drop test, each of the through-void(s) and/or edge cavit(y)(ies) receive, or otherwise accommodate, (a) respective aircraft structure(s) that was determined to translate, during the drop impact of the aircraft, into the fuel cell area(s) of the aircraft, pushed into the fuel cell area(s) of the aircraft by impact of the aircraft with the surface, thereby preventing rupture of the shaped fuel cell(s) by the respective aircraft structure(s).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
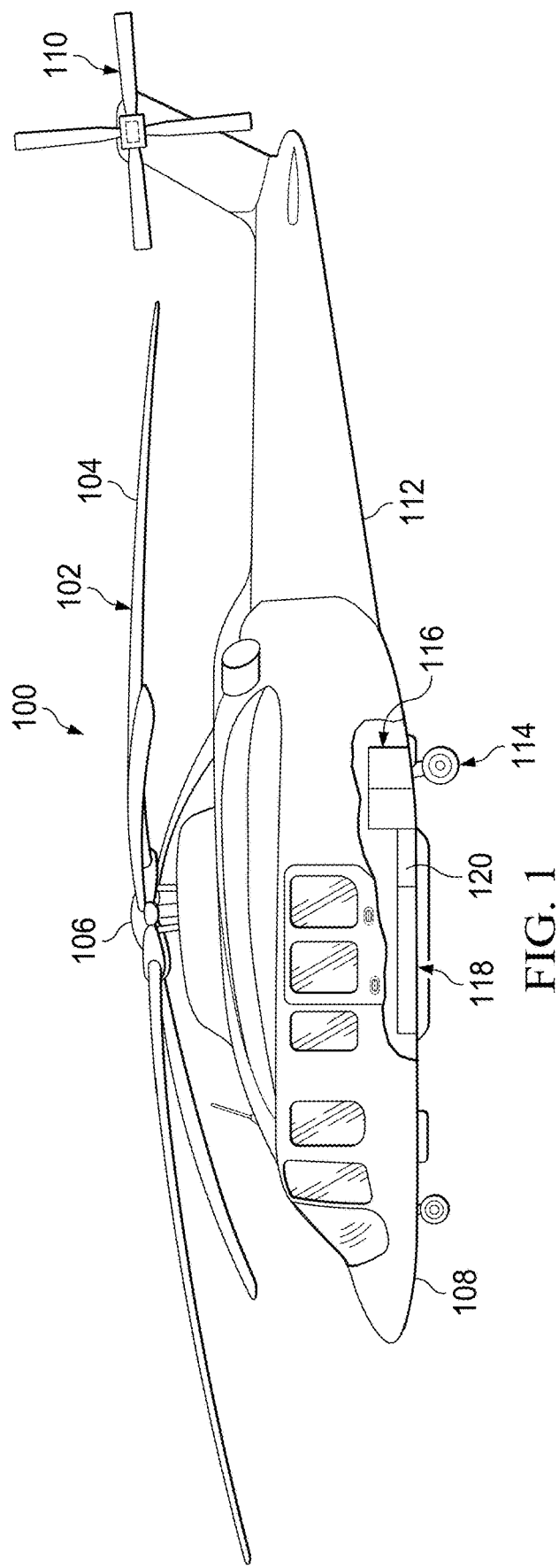
Figure 2:
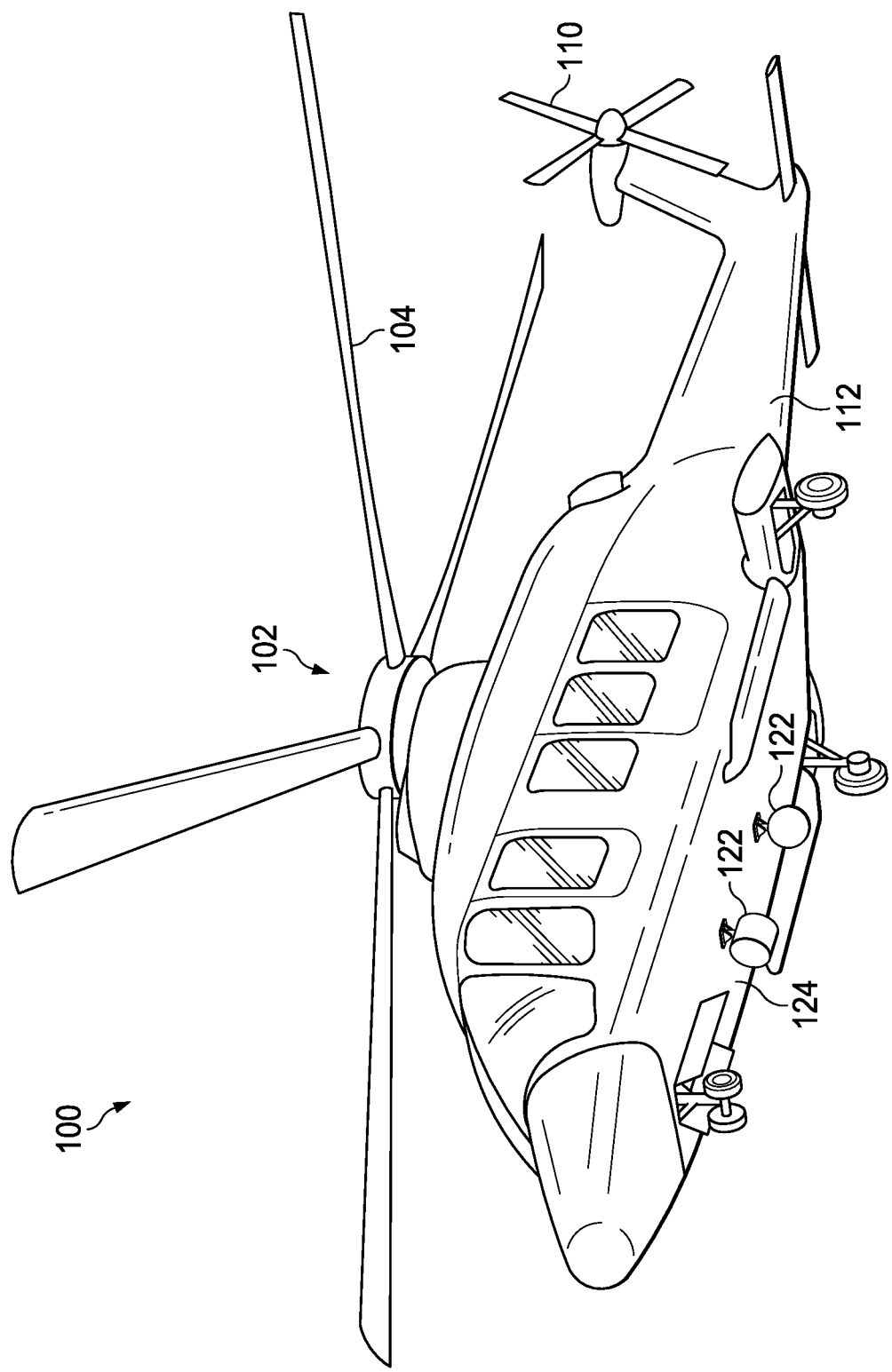
Figure 3:
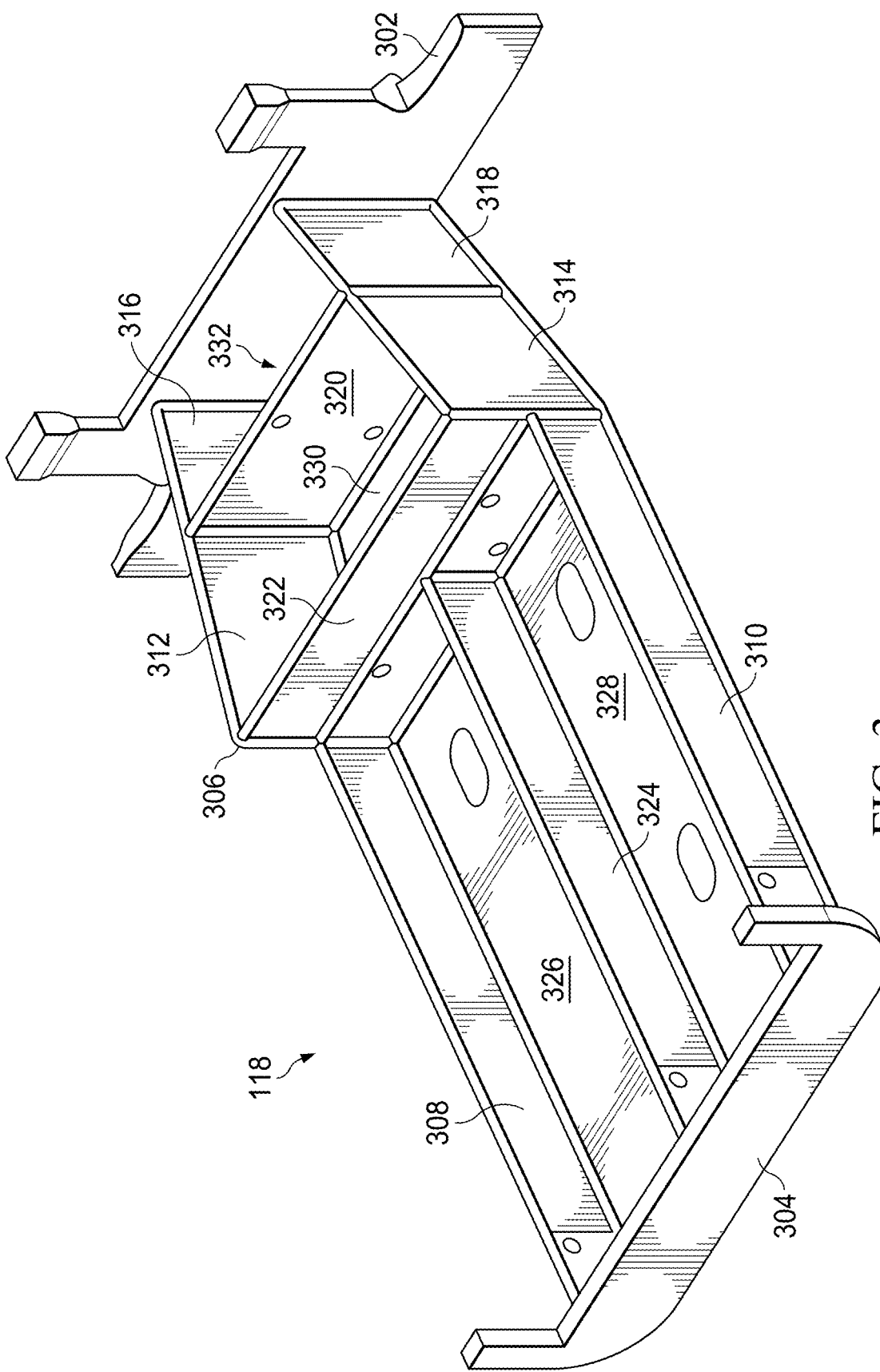
Figure 4:
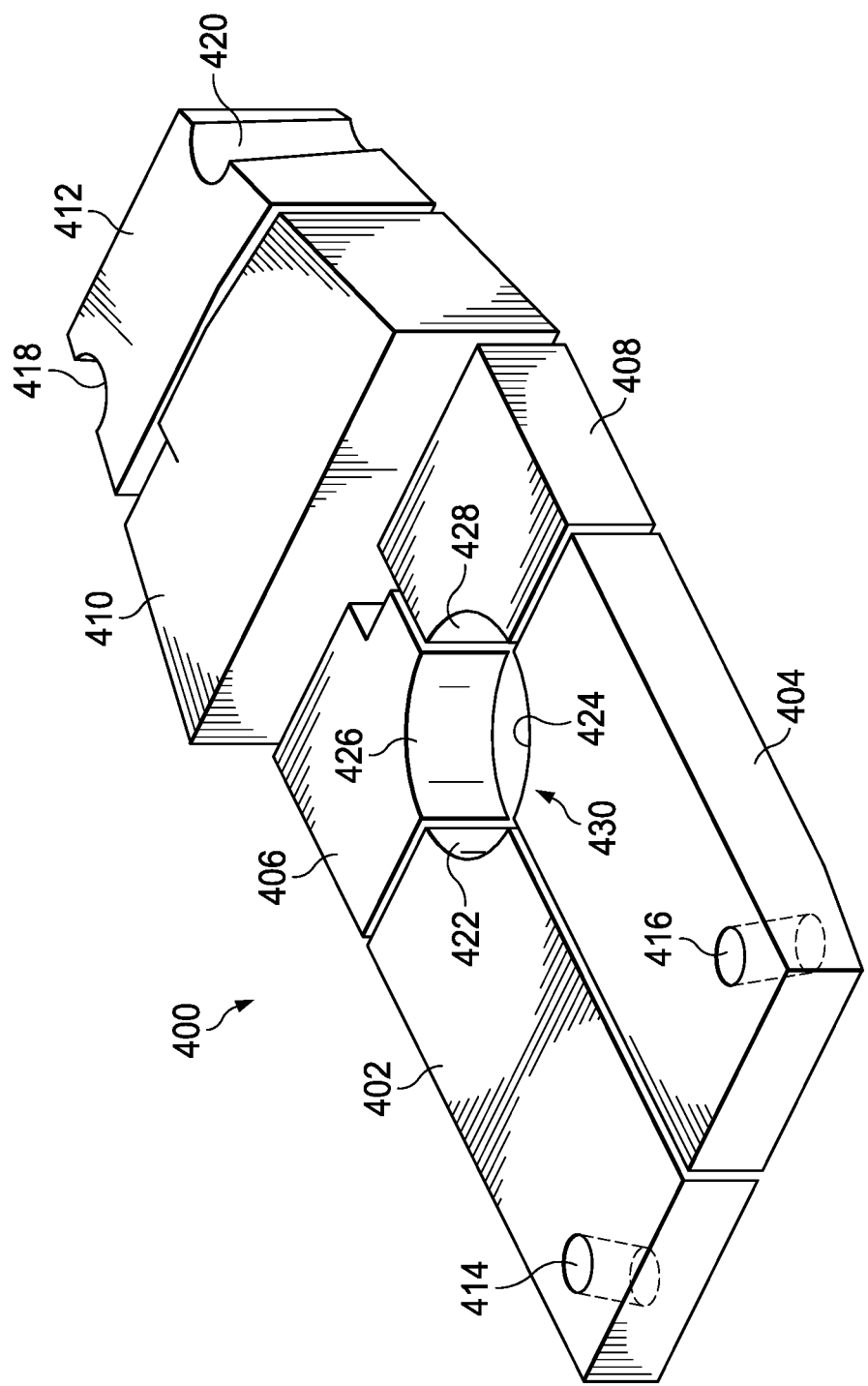
Figure 5:
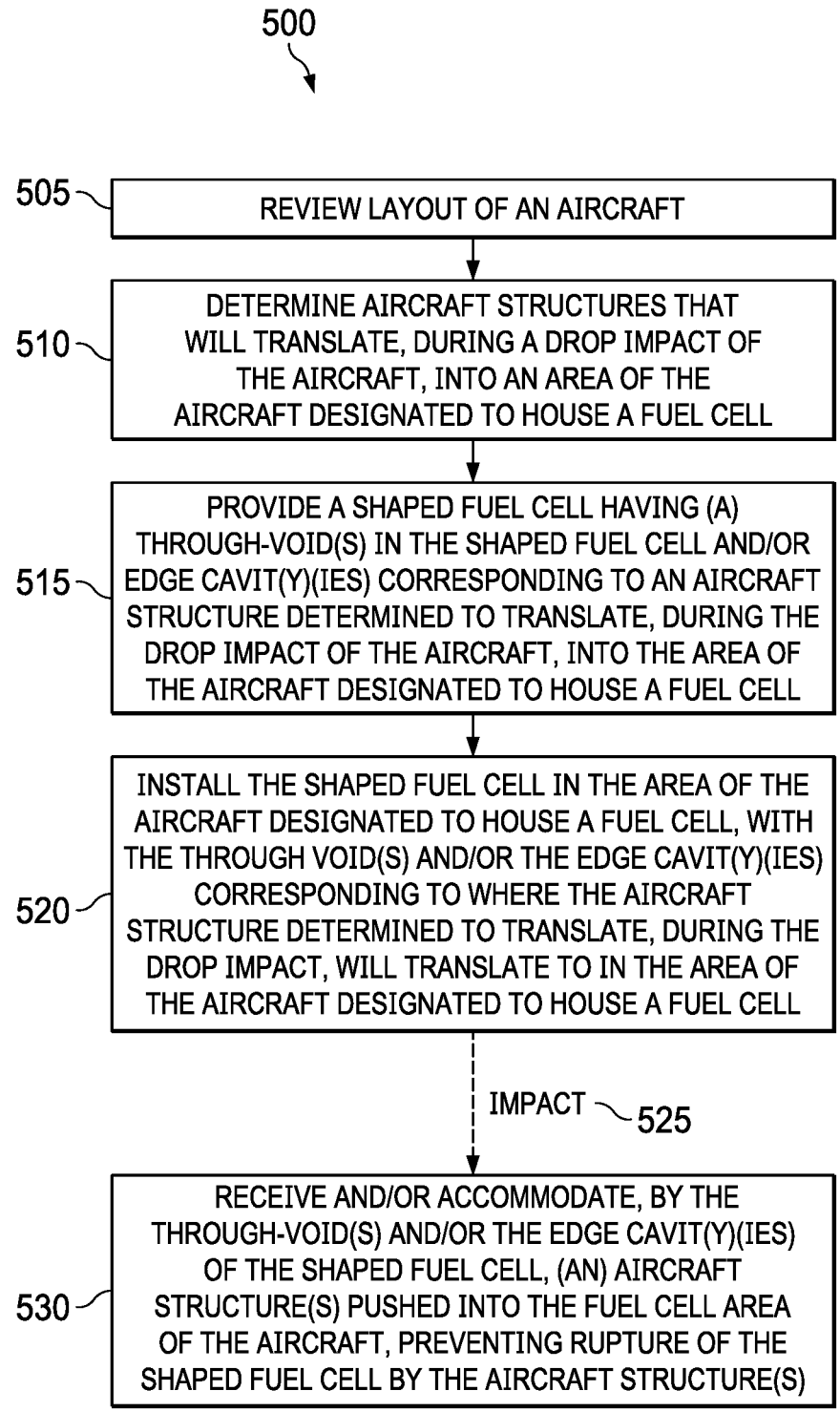
Figure 6:
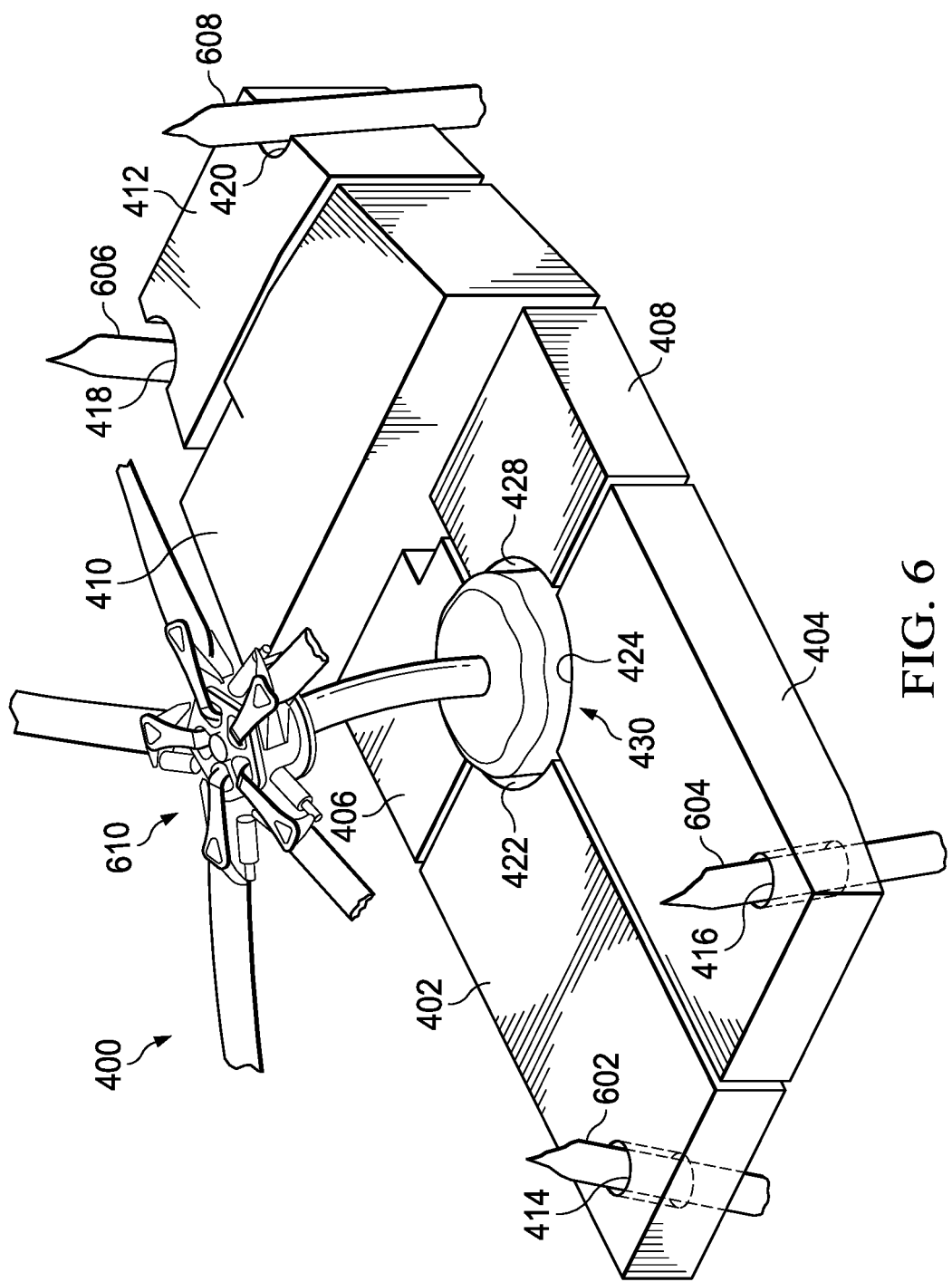

Having thus described the invention in general terms, reference will now be made to the accompanying drawings, which are not necessarily drawn to scale, and wherein:

FIG. 1 is an oblique, partially fragment, view of an example aircraft capable of use of shaped fuel cells for enhanced crashworthiness, according to some embodiments;

FIG. 2 is another oblique view of an example aircraft capable of use of shaped fuel cells for enhanced crashworthiness, according to some embodiments;

FIG. 3 is an isometric view of an example fuel cell receiving assembly in which shaped fuel cells may be deployed for enhanced crashworthiness, in accordance with some embodiments;

FIG. 4 is an isometric view of a set of example shaped fuel cells for enhanced crashworthiness in accordance with some embodiments;

FIG. 5 is a flowchart of an example method for preventing rupture of fuel cells in an aircraft during a drop impact of the aircraft, according to some embodiments; and FIG. 6 is a partially fragmented isometric view of the set of example shaped fuel cells of FIG. 4 following a drop impact, in accordance with some embodiment.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the present fuel cells, systems and methods relate generally to aircraft, more particularly to aircraft fuel systems, and specifically to shaped aircraft (e.g., rotorcraft) fuel cells, systems and methods for enhanced crashworthiness. In accordance with embodiments of the present systems and methods for preventing rupture of fuel cells in an aircraft during a drop impact of the aircraft, an aircraft, such as a rotorcraft, may have (an) area(s) designated to house (a) fuel cell(s) and (an) aircraft structure(s) that may translate, during a drop impact of the aircraft, into the area(s) designated to house the fuel cell(s). (A) shaped fuel cell(s) may be provided and deployed therein, in accordance with the present systems and methods. Each respective shaped fuel cell may define (a) respective through-void(s) defined through the respective shaped fuel cell, and/or (an) respective edge cavit(y)(ies) defined along an edge of the shaped fuel cell. The respective through-void(s) and/or the respective edge cavit(y)(ies) correspond to the respective aircraft structure(s) that may translate, during the drop impact of the aircraft, into the area(s) of the aircraft designated to house the respective fuel cell(s), to receive and accommodate the respective structure(s) during the drop impact.

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIGS. 1 and 2 are oblique views of example aircraft 100 (rotorcraft 100), which is capable of use of, or which may be adapted to use, embodiments of shaped fuel cells of the present systems and methods for enhanced crashworthiness. Such shaped aircraft fuel cells for enhanced crashworthiness are described in greater detail below with respect to FIGS. 4 through 6. Rotorcraft 100 has rotor system 102 with a plurality of rotor blades 104 and central pylon 106. The pitch of rotor blades 104 can be collectively and cyclically manipulated to selectively control direction, thrust, and lift of rotorcraft 100. Rotorcraft 100 includes fuselage 108, anti-torque system 110 and empennage 112. Rotorcraft 100 has landing gear system 114 to provide ground support for the aircraft. Landing gear system 114 is illustrated as a set of retractable wheels. However, a rotorcraft may alternatively (or additionally) employ skids, floats, or the like, which may be supported by a number of struts, or the like, extending from such skids, floats or the like to fuselage 108. Rotorcraft 100 may include fuel cell receiving assembly 116, or the like, which may be located within a lower portion of fuselage 108, and which may support and contain fuel system 118 including one or more fuel cells 120. Liquid fuel is contained within fuel cells 120 that is used to power one or more engines that drive rotor system 102 and anti-torque system 110. With attention directed specifically to FIG. 2, one or more structures 122 may be mounted on (i.e., to and/or through) belly or underside 124 of fuselage 108 of aircraft 100. Structures 122 may include, by way of example, one or more of landing gear, skid mounting struts, antennas, cameras, (search) lights, speakers, firefighting equipment, spraying equipment, cargo hook(s), infrared sensors, armaments, retractable steps, or the like, including mounting structures for such equipment.

It should be appreciated that rotorcraft 100 is merely illustrative of a variety of aircraft that can implement the embodiments disclosed herein. Other aircraft implementations can include hybrid aircraft, tilt rotor aircraft, unmanned aircraft, gyrocopters, and a variety of helicopter configurations, to name a few examples. Further, while the fuel cells discussed herein are described with respect to containing a liquid fuel, the fuel may be gaseous, and/or the fuel cells may be of another nature such as batteries (such as may be employed in electric vertical takeoff and landing aircraft), or the like. It should also be appreciated that even though aircraft are particularly well suited to implement the embodiments of the present disclosure, non-aircraft vehicles and devices can also implement the embodiments.

FIG. 3 is an isometric view of example fuel cell receiving assembly 116 in which shaped fuel cells, such as described below, with respect to FIGS. 4 though 6 may be deployed for enhanced crashworthiness, in accordance with various embodiments. Fuel cell receiving assembly 116 may be fully or partially integral with fuselage 108 of rotorcraft 100 or may be independent of but secured to fuselage 108 of rotorcraft 100. In the illustrated embodiment, rotorcraft bulkhead 302 forms an aft portion of fuel cell receiving assembly 116 and rotorcraft bulkhead 304 forms a forward portion of fuel cell receiving assembly 116. Rotorcraft bulkhead 302 and rotorcraft bulkhead 304 may be formed from a metal such as aluminum, composite, or other suitable material. Fuel cell receiving assembly 116 includes a frame structure 306 that may be a unitary frame structure or may be formed from a plurality of frame elements. Frame structure 306 may be formed from a metal such as aluminum, polymer, composite, or other suitable material. Frame structure 306 supports a plurality of a panel members including side panel members 308, 310 of a forward portion of fuel cell receiving assembly 116, side panel members 312, 314 of a middle portion of fuel cell receiving assembly 116 and side panel members 316, 318 of an aft portion of fuel cell receiving assembly 116. Frame structure 306 also supports lateral panel 320 between the middle and aft portions of fuel cell receiving assembly 116 and panel 322 between the forward and middle portions of fuel cell receiving assembly 116. Frame structure 306 further supports longitudinal panel 324 between right and left sections of the forward portion of fuel cell receiving assembly 116. Frame structure 306 supports lower panels 326, 328 in the forward portion of fuel cell receiving assembly 116, lower panel 330 in the middle portion of fuel cell receiving assembly 116 and a lower panel 332 in the aft portion of fuel cell receiving assembly 116. Lower panels 326-332 may be adjacent to underside 124 (FIG. 2) of aircraft 100, or alternatively, lower panels 326-332 may be underside 124 of aircraft 100, in which case underside 124 may support the various other panels of frame structure 306.

The various panels may be formed from a metal such as aluminum, polymer, composite, or other suitable material and may be attached to, coupled to or integral with frame structure 306. The various panels include openings to allow fluid lines or other systems to pass through one or more panels or entirely through fuel cell receiving assembly 116. Even though fuel cell receiving assembly 116 has been described as having frame and panel construction, it should be understood by those skilled in the art that fuel cell receiving assembly 116 could be constructed in any number of different manners including, but not limited to, as a single unitary assembly, as multiple unitary subassemblies such as a front subassembly, a middle subassembly, and an aft subassembly, or in another suitable manner. Likewise, portions of fuel cell receiving assembly 116 could alternatively be formed by sections of keel beams connected to or integral with fuselage 108 of rotorcraft 100 such as a pair of side keel beams and a central keel beam each of which extends in the longitudinal direction of fuel cell receiving assembly 116. Regardless of the specific manner of construction, important features of fuel cell receiving assembly 116 include being sized and shaped to operably receive and contain fuel cell 120 (e.g., enhanced crashworthiness shaped aircraft fuel cells 402 through 412 described below) therein.

FIG. 4 is an isometric view of set 400 of example enhanced crashworthiness shaped fuel cells 402 through 412. Shaped fuel cells 402 through 412 may be adapted for use in rotorcraft 100 (as, for example, FIG. 1 illustrated fuel cell 120) such as for deployment in fuel cell receiving assembly 116, described above. Referring now to FIG. 4, illustrated embodiment shaped fuel cells 402 through 412 may be interconnected, and may include, by way of example, forward shaped fuel cells 402, 404, shaped feed shaped fuel cells 406, 408, middle fuel cell 410 and aft shaped fuel cell 412. Also, as illustrated, the height of middle cell 410 and aft cell 412 may be greater than that of forward cells 402, 404 and feed cells 406, 408. The volume of fuel that may be stored in shaped fuel cells 400 (120) will depend on the particular implementation but will typically be on the order of several hundred to a thousand gallons. Even though shaped fuel cell set 400 (120) has been described as having a particular number of shaped fuel cells in a particular configuration, it should be understood by those skilled in the art that shaped fuel cell 400 (120) could have any number of shaped fuel cells both less than or greater than six and the shaped fuel cells could be arranged in any manner of different configurations depending upon the particular implementation. Although the term fuel cell is used in the example embodiment, it will be understood that the fuel protection system disclosed herein may be used with any flexible or rigid fuel tank manufactured of any material. To wit, fuel cells 400 may be constructed of a rigid material, such as an aluminum, polymer, composite, or other material. Alternatively, structure Fuel cells 400 may be created using flexible materials or ballistic fabric, such as Kevlar®, or other strong synthetic polymer.

As noted, lower panels 326 though 332 of fuel cell receiving assembly 116, or the like may form underside 124 (FIG. 2) of aircraft 100 or may be adjacent to underside 124. During a crash, such as a vertical drop impact of aircraft 100 (e.g., hard landing), one or more structures on underside 124 may puncture, deform, or otherwise damage underside 124. As a result, one or more of fuel cells 402 through 412 may be ruptured by the structures protruding into the aircraft. Also, one or more lower panels 326 through 332 of fuel cell receiving assembly 116 may be damaged and may in turn puncture, tear, split, or otherwise damage one or more of fuel cells 402 through 412. Such damage may result in one or more of fuel cells 402 through 412 leaking fuel during and following a crash impact, thereby creating a post-crash fire risk.

To address such risks, embodiments of the present systems and methods employ shaped aircraft fuel cells, which may have one or more voids or through-voids 414, 416 defined into or through the shaped fuel cell, and/or one or more edge cavities 418 through 428 defined along (an) edge(s) of the shaped fuel cell(s). In the embodiment shown in FIG. 4 corresponding edge cavities 422 through 428 define "collective" through-void 430 in shaped fuel cell assembly 400. In accordance with embodiments of the present systems and methods, the through-voids and/or the edge cavities correspond to aircraft structures that will translate, or otherwise extend, during a drop impact of the aircraft, into an area of the aircraft designated to house the shaped fuel cell(s). That is, in various embodiments, the shaped fuel cell through-void(s), and/or edge cavit(y)(ies), may each correspond, in shape and orientation, to a respective aircraft structure that will translate, during a drop impact of the aircraft, into the area of the aircraft designated to house the shaped fuel cell(s).

Embodiments of the present systems and methods are intended to address situations where the aircraft structure translates into an area of the aircraft housing the shaped fuel cell is pushed upward into the area of the aircraft housing the shaped fuel cells by impact of the aircraft with a (nondeforming, e.g., hard) surface, during the drop impact of the aircraft. This structure pushed upward into the fuel cell area will be received and accommodated by a corresponding through-void or edge cavity defined in a corresponding shaped fuel cell, preventing rupture of the shaped fuel cell by the crash-translated aircraft structure, in accordance with embodiments of the present systems and methods. This structure that may be pushed upward into the fuel cells, may, as noted above, include, by way of example structures mounted to the exterior of the aircraft, such as, landing gear, skid mounting struts, antennas, cameras, (search) lights, speakers, firefighting equipment, spraying equipment, cargo hook(s), infrared sensors, armaments, retractable steps, or the like, including mounting structures for such equipment, that may be mounted to the exterior of the aircraft, such as to (or through) belly 124 of the aircraft. Also, composite structures, or the like, of the aircraft may buckle during a drop impact creating sharp debris that may translate upward or downward into aircraft fuel cell areas.

Embodiments of the present systems and methods are also intended to address situations where the aircraft structure translates, during a drop impact of the aircraft, into the area of the aircraft designated to house the fuel cell by being pushed downward, by inertia, into the area of the aircraft housing the fuel cell by impact of the aircraft with the surface. Such structures may include structures within, or otherwise a part of the aircraft, for example, seat legs, air bottles, or the like deployed within the aircraft. The rotor pylon of a rotorcraft may puncture the roof and penetrate the floor of the rotorcraft during a drop impact, due to the pylon's weight. Again, (a) structure(s) forced downward into the area housing the fuel cells by inertia during a drop impact may be received, and accommodated, by a corresponding through-void or edge cavity defined in the (corresponding) shaped fuel cell, preventing rupture of the shaped fuel cell by the aircraft structure, in accordance with embodiments of the present systems and methods.

In accordance with embodiments of the present systems and methods, through-voids 414, 416 defined into or through the shaped fuel cell, and/or one or more edge cavities 418 through 428 defined along (an) edge(s) of the shaped fuel cell(s) may be adapted to receive (a) fuel cell cushion(s) disposed between the inner surface of fuel cell receiving assembly 118 and the through-voids and/or edge cavities, or between edge cavities (e.g. edge cavities 422 through 428 in collective through void 430), to cushion the one or more fuel cells from damage. Such fuel cell cushions may be machined from a foam substrate to form a shaped foam substrate that is substantially covered with a cushion coating. The cushion coating may be sprayable onto the shaped foam substrate such that the fuel cell cushion is substantially nonabsorbent of fuel.

As discussed, the drop impact of the aircraft addressed by embodiments of the present systems and methods for enhanced crashworthiness may be a crash, har landing, or the like. However, embodiments of the present systems and methods may, thereby, exhibit such enhanced crashworthiness when the drop impact of the aircraft in question is a drop test, such as for fuel tank crashworthiness (e.g., from a height of at least 50 feet).

FIG. 5 is a flowchart of example method 500 for preventing rupture of shaped fuel cells in an aircraft during a drop impact of the aircraft, such as during a crash or hard landing, according to some embodiments. At 505, the layout (e.g., plans, schematics, a prototype, etc.) of a subject aircraft is reviewed and aircraft structures that will translate or otherwise extend, into an area of the aircraft designated to house a fuel cell during a drop impact of the aircraft are determined at 510. At 515, one or more shaped fuel cells defining one or more through-voids in the shaped fuel cell and/or one or more edge cavities in the shaped fuel cell are provided (e.g., designed and manufactured). In these shaped fuel cells, the(se) through-void(s) and/or edge cavit(y)(ies) each correspond to an aircraft structure determined at 505 and 510 as disposed to translate, during the drop impact of the aircraft, into the area of the aircraft designated to house the fuel cell(s). At 520 the shaped fuel cell(s) are installed in the area of the aircraft designated to house the fuel cell(s) with the one or more through voids and/or the one or more edge cavities corresponding to the aircraft structure projected/determined to translate, during the drop impact of the aircraft, into the area of the aircraft designated to house the fuel cell(s).

As a result of the review, determinations, fuel cell production and installation described in steps 505 through 520 above, when the subject aircraft crashes as a result of a drop impact, or (the shaped fuel cell assembly) is drop tested, at 525, (a) respective aircraft structure(s) that was (were) determined at 510 to translate during the drop impact of the aircraft into the area of the aircraft designated to house the fuel cell, push into the area of the aircraft designated to house the fuel cell by impact of the aircraft with a surface, the structure(s) are received, or otherwise accommodated, by (the) through-void(s) and/or (the) edge cavit(y)(ies), at 530 preventing rupture of the shaped fuel cell(s) by the respective aircraft structure(s).

FIG. 6 is an isometric view of the set of example shaped fuel cells 400 of FIG. 4 following a drop impact, in accordance with some embodiment. FIG. 6 shows a situation where aircraft structures 602 through 610 have translated into an area of the aircraft housing shaped fuel cells 400. Structures 602, 604, 606, and 608 (such as illustrated landing skid struts) have been pushed upward into the area of the aircraft housing shaped fuel cells 400 by impact of the aircraft with a (nondeforming, e.g., hard) surface, during the drop impact of the aircraft. Structure that may be pushed upward into the fuel cells, may, as noted above, be landing gear, skid mounting struts, antennas, cameras, (search) lights, speakers, firefighting equipment, spraying equipment, cargo hook(s), infrared sensors, armaments, retractable steps, or the like, including mounting structures for such equipment, that may be mounted to the exterior of the aircraft, such as to (or through) belly 124 of the aircraft. Structures 602 through 608 pushed upward into the fuel cell area are shown as received and accommodated by corresponding through-voids 414 and 416, or corresponding edge cavities 418 and 420, defined in corresponding shaped fuel cells 402, 404, and 412, respectively, preventing rupture of shaped fuel cells 402, 404, and 412 by crash-translated aircraft structures 602 through 608, in accordance with embodiments of the present systems and methods.

FIG. 6 also shows aircraft structure 610 translated into an area of the aircraft housing shaped fuel cells 400. Therein, an aircraft structure, such as illustrated rotor pylon 610, has translated, during a drop impact of the aircraft, into the area of the aircraft designated to house fuel cells 400 by being pushed downward, by inertia, at impact of the aircraft with a surface. Structures that may be pushed downward into the fuel cells, may, as noted above, include structures within, or otherwise a part of the aircraft, such as, seat legs, air bottles, or the like deployed within the aircraft, and/or the rotor pylon of a rotorcraft, which may puncture the roof and penetrate the floor of the rotorcraft during a drop impact, due to the pylon's weight. Structure 610 forced downward into the area housing shaped fuel cells 400 by inertia during a drop impact is shown received, and accommodated, by corresponding edge cavities 422 through 428, defined by corresponding shaped fuel cells 402, 404, 406 and 408, in turn, defining collective through-void 430 in shaped fuel cell assembly 400. Accommodation of drop impact inertia-translated structure 610 by corresponding edge cavities 422 through 428 prevents rupture of shaped fuel cells 400 by this aircraft structure during the drop impact, in accordance with embodiments of the present systems and methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An aircraft comprising:
an area designated to house a fuel cell;
an aircraft structure that translates, during a drop impact of the aircraft, into the area designated to house the fuel cell; and
a shaped fuel cell configured to contain a liquid or gaseous fuel, comprising a through-void defined through the shaped fuel cell, or an edge cavity defined along an edge of the shaped fuel cell, the through-void or the edge cavity corresponding to the aircraft structure that translates, during the drop impact of the aircraft, into the area of the aircraft designated to house the fuel cell and into the location of the through-void or the edge cavity.

2. The aircraft of claim 1, wherein the aircraft further comprises:
a plurality of areas designated to house fuel cells and a plurality of aircraft structures that translate, during a drop impact of the aircraft, into one or more the areas designated to house the fuel cells; and
a plurality of shaped fuel cells configured to contain a liquid or gaseous fuel, each respective shaped fuel cell comprising one or more through-voids defined through the respective shaped fuel cell, or one or more edge cavities defined along one or more edges of each respective shaped fuel cell, the one or more through-voids or one or more edge cavities, each corresponding to a respective one of the aircraft structures that translate, during the drop impact of the aircraft, into a respective one of the areas of the aircraft designated to house the fuel cells and into the location of the respective one of the one or more through-voids or edge cavities.

3. The aircraft of claim 1, wherein the aircraft comprises a rotorcraft.

4. The aircraft of claim 1, wherein the drop impact of the aircraft is a crash.

5. The aircraft of claim 1, wherein the drop impact of the aircraft comprises a drop test.

6. The aircraft of claim 1, wherein the aircraft structure that translates, during a drop impact of the aircraft, into the area of the aircraft designated to house the fuel cell is pushed into the area of the aircraft designated to house the fuel cell as a result of impact of the aircraft with a surface.

7. The aircraft of claim 1, wherein the aircraft structure that translates, during a drop impact of the aircraft, into the area of the aircraft designated to house the fuel cell is pushed upward into the area of the aircraft designated to house the fuel cell by impact of the aircraft with a surface.

8. The aircraft of claim 1, wherein the aircraft structure that translates, during a drop impact of the aircraft, into the area of the aircraft designated to house the fuel cell is pushed downward, by inertia, into the area of the aircraft designated to house the fuel cell by impact of the aircraft with a surface.

9. A method for preventing rupture of fuel cells in an aircraft during a drop impact of the aircraft comprising:
reviewing a layout of an aircraft and determining aircraft structures that will translate, during a drop impact of the aircraft, into a fuel cell area of the aircraft;
providing a shaped fuel cell configured to hold a liquid or gaseous fuel, comprising:
defining one or more through-voids in the shaped fuel cell, each through-void corresponding to an aircraft structure determined to translate, during the drop impact of the aircraft, into the fuel cell area of the aircraft and into the location of the one or more through-voids; or
defining one or more edge cavities in the shaped fuel cell, each edge cavity corresponding to an aircraft structure determined to translate, during the drop impact of the aircraft, into the fuel cell area of the aircraft and into the location of the one or more edge cavities; and
installing the shaped fuel cell in the fuel cell area of the aircraft with the one or more through-voids or the one or more edge cavities corresponding to the aircraft structures determined to translate, during the drop impact of the aircraft, into the fuel cell area of the aircraft.

10. The method of claim 9, further comprising receiving and accommodating, by each of the one or more through-voids or the one or more edge cavities, a respective aircraft structure that was determined to translate, during the drop impact of the aircraft, into the fuel cell area of the aircraft, pushed into the fuel cell area of the aircraft by impact of the aircraft with a surface, preventing rupture of the shaped fuel cell by the respective aircraft structure.

11. The method of claim 9, wherein the drop impact of the aircraft is a drop test.

12. The method of claim 9, wherein the aircraft comprises a plurality of fuel cell areas and a plurality of shaped fuel cells configured to contain a liquid or gaseous fuel and the method further comprises:
  reviewing the layout of the aircraft and determining aircraft structures that will translate, during a drop impact of the aircraft, into each fuel cell area of the aircraft;
  providing the plurality of shaped fuel cells comprising:
    defining one or more through-voids in each respective shaped fuel cell, each through-void corresponding to a respective aircraft structure determined to translate, during the drop impact of the aircraft, into a respective fuel cell area of the aircraft and into the location of the one or more through-voids; or
    defining one or more edge cavities in each respective shaped fuel cell, each edge cavity corresponding to a respective aircraft structure determined to translate, during the drop impact of the aircraft, into the respective fuel cell area of the aircraft and into the location of the one or more edge cavities; and
  installing the respective shaped fuel cells in the respective fuel cell areas of the aircraft, with each of the one or more through voids or each of the one or more edge cavities corresponding to the respective aircraft structure determined to translate, during the drop impact of the aircraft, into the respective fuel cell areas of the aircraft.

13. The method of claim 12, further comprising receiving and accommodating, by each of the one or more through-voids or the one or more edge cavities, the respective aircraft structure that was determined to translate, during the drop impact of the aircraft, into a respective fuel cell area of the aircraft, pushed into the respective fuel cell area of the aircraft by impact of the aircraft with a surface, preventing rupture of the shaped fuel cells by the aircraft structures, during the drop impact of the aircraft.

* * * * *